(12) United States Patent
Higashiyama et al.

(10) Patent No.: US 11,092,197 B2
(45) Date of Patent: Aug. 17, 2021

(54) ROLLING BEARING DEVICE AND METHOD OF DETECTING ABNORMALITY OF BEARING PORTION

(71) Applicant: JTEKT CORPORATION, Osaka (JP)

(72) Inventors: Yoshimichi Higashiyama, Kashihara (JP); Yusuke Ueda, Tondabayashi (JP); Tsukasa Sakazaki, Kizugawa (JP)

(73) Assignee: JTEKT CORPORATION, Osaka (JP)

( * ) Notice: Subject to any disclaimer, the term of this patent is extended or adjusted under 35 U.S.C. 154(b) by 291 days.

(21) Appl. No.: 16/152,783

(22) Filed: Oct. 5, 2018

(65) Prior Publication Data

US 2019/0113081 A1    Apr. 18, 2019

(30) Foreign Application Priority Data

Oct. 13, 2017  (JP) .............................. JP2017-199422

(51) Int. Cl.
*F16C 41/00*    (2006.01)
*F16C 19/02*    (2006.01)
(Continued)

(52) U.S. Cl.
CPC .............. *F16C 41/00* (2013.01); *F16C 19/02* (2013.01); *F16C 19/163* (2013.01);
(Continued)

(58) Field of Classification Search
CPC .... F16C 19/02; F16C 19/163; F16C 2233/00; F16C 2322/39; F16C 33/6659; F16C 33/6674; F16C 41/00
See application file for complete search history.

(56) References Cited

U.S. PATENT DOCUMENTS

2014/0266741 A1* 9/2014 Lewis .................... G01K 13/02
                                                                  340/584
2017/0219011 A1* 8/2017 Sakazaki ............... F16C 19/525
(Continued)

FOREIGN PATENT DOCUMENTS

| JP | H07-077300 A | 3/1995 |
| JP | 2013-104520 A | 5/2013 |
| JP | 2017-026157 A | 2/2017 |

OTHER PUBLICATIONS

Jun. 8, 2021 Office Action issued in Japanese Application No. 2017-199422.

*Primary Examiner* — Roy Y Yi
*Assistant Examiner* — Geoffrey T Evans
(74) *Attorney, Agent, or Firm* — Oliff PLC (57) ABSTRACT

A rolling bearing device includes: a bearing portion; an oil supply unit that has a pump; a first detection portion that detects operation of the pump; a second detection portion that detects the rotational state of the bearing portion; and a processing portion that generates determination information related to the lubrication state of the bearing portion on the basis of a detection signal from the first detection portion and a detection signal from the second detection portion. The processing portion outputs, to the pump, an instruction signal for oil supply when it is determined that operation of the pump is appropriate and that the rotational state of the bearing portion is not appropriate, and re-determines, after the lapse of a predetermined time, whether or not the rotational state of the bearing portion is appropriate.

5 Claims, 7 Drawing Sheets

(51) Int. Cl.
*F16C 19/16* (2006.01)
*F16C 33/66* (2006.01)

(52) U.S. Cl.
CPC ...... *F16C 33/6659* (2013.01); *F16C 33/6674* (2013.01); *F16C 2233/00* (2013.01); *F16C 2322/39* (2013.01)

(56) References Cited

U.S. PATENT DOCUMENTS

| | | | |
|---|---|---|---|
| 2017/0276177 A1* | 9/2017 | Nozaki | G01M 13/04 |
| 2018/0149201 A1* | 5/2018 | Sakazaki | F16C 19/06 |
| 2018/0149202 A1* | 5/2018 | Sakazaki | F16C 41/002 |
| 2018/0223819 A1* | 8/2018 | Higashiyama | F04B 23/025 |
| 2019/0086382 A1* | 3/2019 | Inaba | G01N 33/0022 |

* cited by examiner

| | PATTERN | | | |
|---|---|---|---|---|
| | 1 | 2 | 3 | 4 |
| PUMP OPERATION | NG (×) | NG (×) | OK (○) | OK (○) |
| ROTATIONAL STATE OF BEARING PORTION | OK (○) | NG (×) | OK (○) | NG (×) |
| DETERMINATION OF STATE OF BEARING DEVICE | NG (×) | NG (×) | OK (○) | OK (○) / NG (×) |

ROLLING BEARING DEVICE AND METHOD OF DETECTING ABNORMALITY OF BEARING PORTION

INCORPORATION BY REFERENCE

The disclosure of Japanese Patent Application No. 2017-199422 filed on Oct. 13, 2017, including the specification, drawings and abstract, is incorporated herein by reference in its entirety.

BACKGROUND OF THE INVENTION

1. Field of the Invention

The present invention relates to a rolling bearing device and a method of detecting an abnormality of a bearing portion.

2. Description of the Related Art

In recent years, various types of machine tools are requested to increase the speed of a main spindle in order to improve the processing efficiency and the production efficiency. When the main spindle is rotated at a high speed, the lubricating property of a bearing portion that supports the main spindle is particularly important. Thus, there is proposed a rolling bearing device in which an oil supply unit is provided adjacent to a bearing portion in the axial direction (see Japanese Patent Application Publication No. 2017-26157 (JP 2017-26157 A)). The oil supply unit has a pump or the like in order to supply lubricating oil to the bearing portion.

In the case of the oil supply unit described in JP 2017-26157 A, the pump ejects lubricating oil as oil droplets of several picoliters to several nanoliters, and rolling elements (balls) of the bearing portion and raceways with which the rolling elements make rolling contact are determined as a target of the oil droplets.

Once the oil supply unit described above is incorporated in a device, the lubrication state of the bearing portion cannot be grasped from the outside. That is, it cannot be determined whether or not the pump of the oil supply unit is operating appropriately in order to discharge lubricating oil and oil droplets reach the desired target to contribute to lubrication. In the case where oil droplets do not reach the target although the pump is operating normally, there may occur a defect such as a seizure due to a shortage of lubricating oil at the bearing portion.

SUMMARY OF THE INVENTION

It is an object of the present invention to suppress occurrence of a defect at a bearing portion with the bearing portion brought into a poor lubrication state.

According to an aspect of the present invention, a rolling bearing device includes: a bearing portion that has an inner ring, an outer ring, and a plurality of rolling elements provided between the inner ring and the outer ring; an oil supply unit that has a pump that supplies lubricating oil to an annular space formed between the inner ring and the outer ring; a first detection portion that detects operation of the pump; a second detection portion that detects a rotational state of the bearing portion; and a processing portion that generates determination information related to a lubrication state of the bearing portion on the basis of a detection signal from the first detection portion and a detection signal from the second detection portion. The processing portion has a first function of determining whether or not the operation of the pump is appropriate on the basis of the detection signal from the first detection portion, and a second function of determining whether or not the rotational state of the bearing portion is appropriate on the basis of the detection signal from the second detection portion. The processing portion further has a third function of outputting, to the pump, an instruction signal for oil supplied by the pump when it is determined through the first function that the operation of the pump is appropriate and it is determined through the second function that the rotational state of the bearing portion is not appropriate, and re-determining whether or not the rotational state of the bearing portion is appropriate through at least the second function after lapse of a predetermined time.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
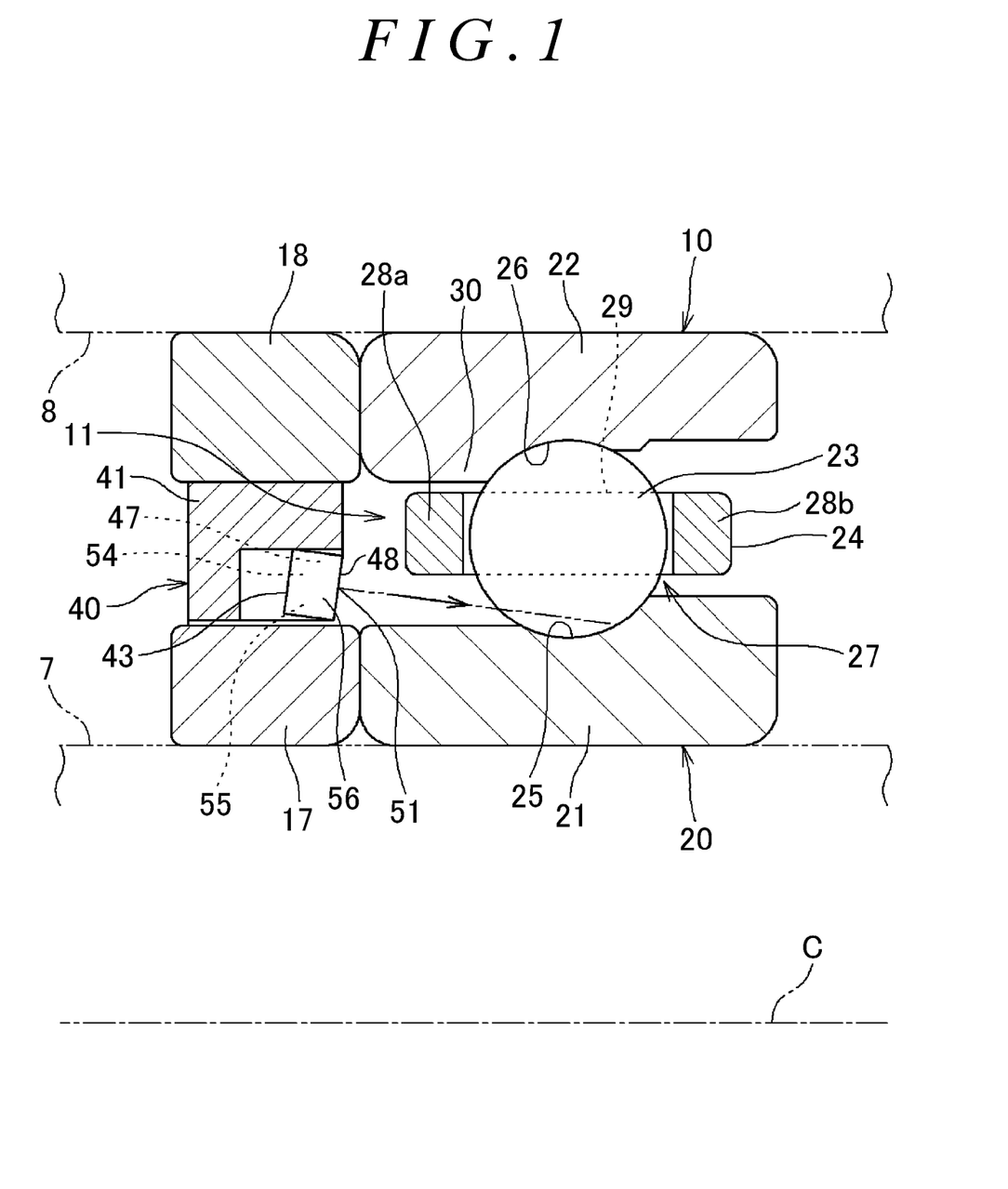
FIG. 1 is a sectional view illustrating an example of a rolling bearing device.

FIG. 1 is a sectional view illustrating an example of a rolling bearing device. A rolling bearing device 10 (hereinafter referred to also as a "bearing device 10") illustrated in FIG. 1 rotatably supports a shaft (main spindle) 7 of a main spindle device of a machine tool, and is housed in a bearing housing 8 of the main spindle device. In FIG. 1, the shaft 7 and the bearing housing 8 are indicated by the long dashed double-short dashed lines. The rolling bearing device 10 according to the present invention is also applicable to devices other than machine tools. In the following description, a direction that is parallel to a central axis C of the bearing device 10 is referred to as an "axial direction", and a direction that is orthogonal to the axial direction is referred to as a "radial direction".

The bearing device 10 illustrated in FIG. 1 includes a bearing portion 20 and an oil supply unit 40. The bearing portion 20 has an inner ring 21, an outer ring 22, a plurality of balls (rolling elements) 23, and a cage 24 that holds the balls 23, and constitutes a ball bearing (rolling bearing). The bearing device 10 further includes an inner ring spacer 17 in a cylindrical shape and an outer ring spacer 18 in a cylindrical shape.

The oil supply unit 40 is in a circular ring shape as a whole, and is provided adjacent to the bearing portion 20 in the axial direction. The oil supply unit 40 according to the present embodiment is provided on the radially inner side of the outer ring spacer 18, and positioned adjacent, in the axial direction, to an annular space 11 formed between the inner ring 21 and the outer ring 22. The annular space 11 has a function of supplying lubricating oil. The configuration and the function of the oil supply unit 40 will be described later. Although not illustrated, the oil supply unit 40 (body portion 41 to be discussed later) and the outer ring spacer 18 may be integrated with each other so that the oil supply unit 40 functions as an outer ring spacer.

In the present embodiment, the outer ring 22, the outer ring spacer 18, and the oil supply unit 40 are attached so as not to be rotatable with respect to the bearing housing 8, and the inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7.

The inner ring 21 is a cylindrical member externally fitted on the shaft 7. A raceway (hereinafter referred to as an "inner ring raceway 25") is formed on the outer periphery of the inner ring 21. In the present embodiment, the inner ring 21 and the inner ring spacer 17 are separate from each other. However, the inner ring 21 and the inner ring spacer 17 may be (inseparably) integral with each other, although not illustrated. The outer ring 22 is a cylindrical member fixed to the inner peripheral surface of the bearing housing 8. A raceway (hereinafter referred to as an "outer ring raceway 26") is formed on the inner periphery of the outer ring 22. In the present embodiment, the outer ring 22 and the outer ring spacer 18 are separate from each other. However, the outer ring 22 and the outer ring spacer 18 may be (inseparably) integral with each other, although not illustrated.

The balls 23 are interposed between the inner ring 21 and the outer ring 22, and rolled on the inner ring raceway 25 and the outer ring raceway 26. The cage 24 has an annular shape, and is provided with a plurality of pockets 27 in which the balls 23 are housed along the circumferential direction. The balls 23 and the cage 24 are provided in the annular space 11.

The cage 24 has an annular shape as a whole, and has an annular portion 28a provided on a first side of the balls 23 in the axial direction, an annular portion 28b provided on a second side of the balls 23 in the axial direction, and a plurality of cage bars 29. The cage bars 29 couple the annular portions 28a and 28b to each other. Spaces between the annular portions 28a and 28b and between the cage bars 29 which are adjacent to each other in the circumferential direction serve as the pockets 27. One ball 23 is housed in each of the pockets 27. With this configuration, the cage 24 can hold the balls 23 at intervals in the circumferential direction.

In the cage 24, the annular portion 28a on the first side (an oil supply unit 40 side) in the axial direction can be brought into slide contact with a shoulder portion 30 of the outer ring 22. Consequently, the cage 24 is positioned in the radial direction by the outer ring 22. That is, in the bearing portion 20, the cage 24 serves as a bearing guided by the outer ring (guided by the bearing ring). Slide contact portions between the annular portion 28a of the cage 24 and the outer ring 22 (shoulder portion 30), as well as between the balls 23 and the inner ring 21 and between the balls 23 and the outer ring 22, are determined as oil supply locations. A shortage of lubricating oil at the oil supply locations may cause vibration at the bearing portion 20, a rise in temperature of the bearing portion 20, or unexpected strain energy at the outer ring 22 or the like. Oil is supplied to the slide contact portion between the cage 24 and the outer ring 22 from the inner ring 21 or the outer ring 22 through the balls 23.

Figure 2:
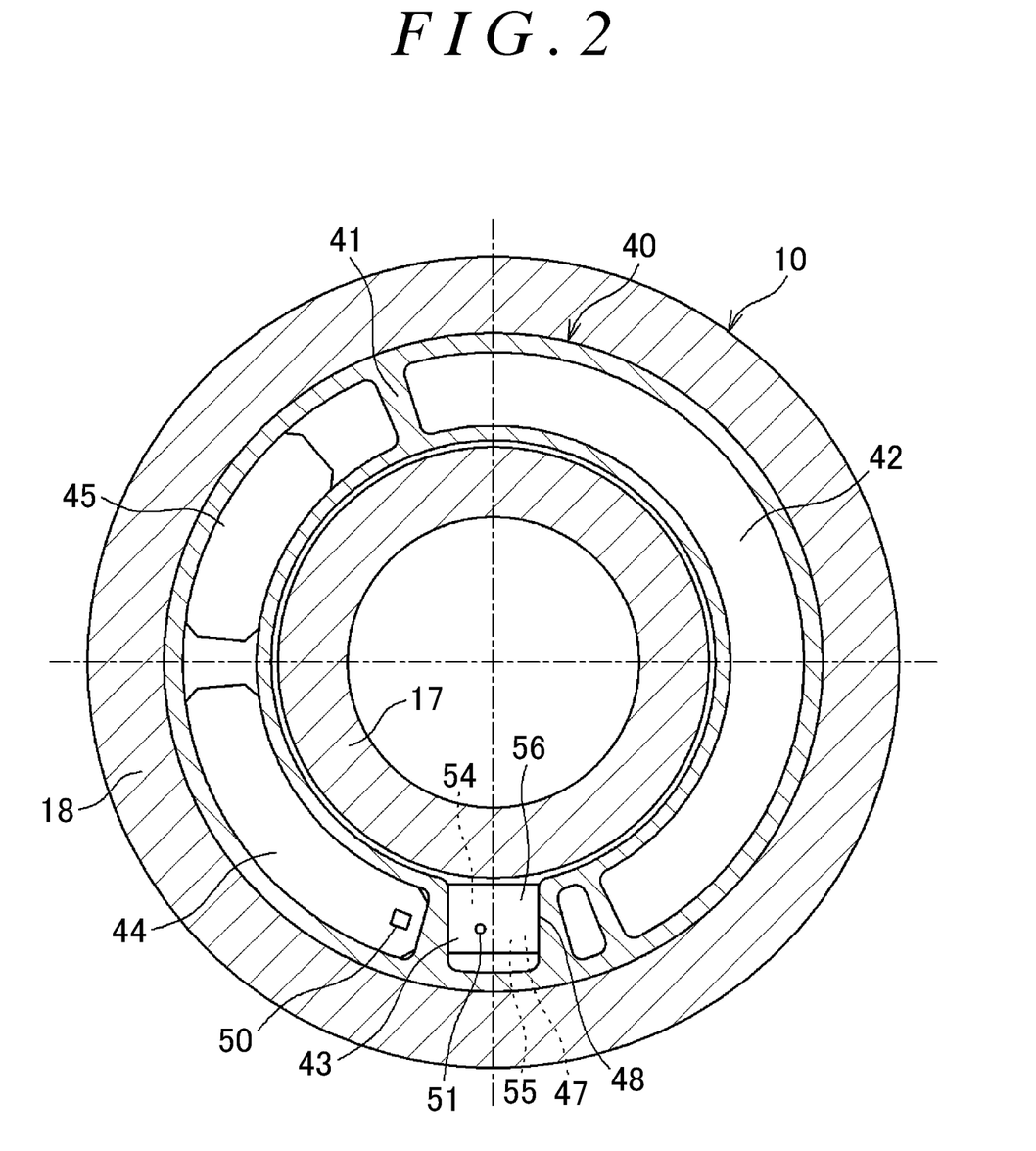
FIG. 2 illustrates an oil supply unit as seen in the axial direction.

FIG. 2 illustrates the oil supply unit 40 as seen in the axial direction. The oil supply unit 40 has a circular ring shape as a whole, and includes an annular body portion 41, a tank 42, and a pump 43. The oil supply unit 40 according to the present embodiment further includes a sensor 50, a control portion 44, and a power source portion 45.

The body portion 41 is an annular member made of a resin, for example, and has a function as a frame that houses (holds) the pump 43 etc. That is, hollow spaces are formed in the body portion 41. The tank 42, the pump 43, the sensor 50, the control portion 44, and the power source portion 45 are provided in the hollow spaces. Consequently, the oil supply unit 40 which includes the body portion 41, the tank 42, the pump 43, the sensor 50, the control portion 44, and the power source portion 45 is constituted integrally.

The tank 42 stores lubricating oil (oil), and is connected to the pump 43 through a flow path in order to supply lubricating oil to the pump 43. The pump 43 has a function of supplying lubricating oil to the annular space 11 of the bearing portion 20. In order to demonstrate this function, the pump 43 has a pump body 48 provided with an ejection port (nozzle) 51 from which lubricating oil is discharged. The pump body 48 has an oil chamber (internal space) 54, which is a space that is connected to the ejection port 51 and that stores lubricating oil, and a piezoelectric element 55. An elastically deformable diaphragm 47 that constitutes a part of a wall of the oil chamber 54 is provided in the pump body 48. The piezoelectric element 55 is attached to the diaphragm 47. When a voltage is applied to the piezoelectric element 55 and the piezoelectric element 55 deforms the diaphragm 47, the volume of the oil chamber 54 is varied.

The ejection port 51 according to the present embodiment is constituted of a minute through hole formed in a wall portion of the pump body 48. The ejection port 51 opens in a side surface of the wall portion. The side surface in which the ejection port 51 opens faces a part of the annular space 11.

As described above, the volume of the oil chamber 54 is varied when the piezoelectric element 55 operates. This allows lubricating oil in the oil chamber 54 to be discharged from the ejection port 51 to the annular space 11 of the bearing portion 20. In particular, when the piezoelectric element 55 operates, lubricating oil is discharged from the ejection port 51 as oil droplets at an initial velocity. That is, the oil droplets fly (are ejected) from the ejection port 51. The ejection port 51 opens toward the inner ring raceway 25 of the bearing portion 20. The oil droplets which are discharged from the ejection port 51 can hit the balls 23, or hit the inner ring raceway 25 even if the oil droplets pass through a space between the balls 23 which are adjacent to each other. Consequently, the oil supply unit 40 can supply oil to the oil supply locations.

The control portion 44 has a function of controlling the timing when the pump 43 is operated. The power source portion 45 (see FIG. 2) supplies electric power for operation of the pump 43, the control portion 44, and the sensor 50.

From the above, the pump 43 receives, in the oil chamber 54, lubricating oil stored in the tank 42. The pump 43 is configured to eject lubricating oil in the oil chamber 54 (cause lubricating oil in the oil chamber 54 to fly) from the ejection port 51 toward the target of the bearing portion 20 as oil droplets. From the viewpoint of efficient use of lubricating oil, the pump 43 ejects a determined amount of oil droplets in one discharge operation to cause the oil droplets to reach the target of the bearing portion 20. Several picoliters to several nanoliters of lubricating oil are ejected from the ejection port 51 as oil droplets in one operation of the pump 43. In the present embodiment, the target is the balls 23 and the inner ring raceway 25.

Figure 3:
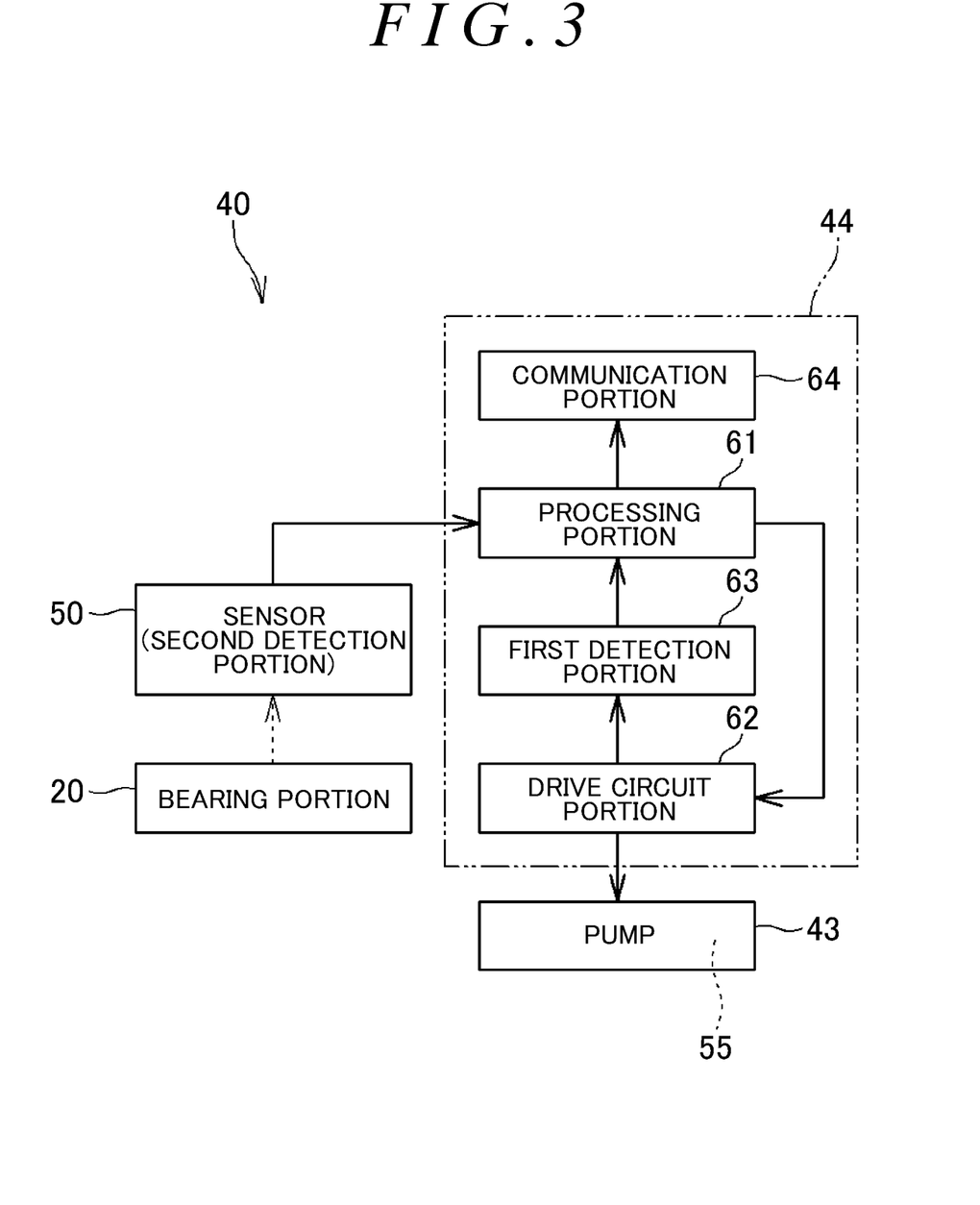
FIG. 3 is a block diagram illustrating the oil supply unit.

FIG. 3 is a block diagram illustrating the oil supply unit 40. The control portion 44 is constituted of a plated circuit that includes a programmed microcomputer, a computation circuit, various elements, and so forth. The control portion 44 includes a processing portion 61 as a functional portion implemented by the microcomputer, and includes a drive circuit portion 62 as a functional portion implemented by the computation circuit, the various elements, and so forth. The oil supply unit 40 further includes a first detection portion 63 that detects the drive voltage of the drive circuit portion 62. As described later, the drive circuit portion 62 applies a drive voltage to the piezoelectric element 55 of the pump 43. The first detection portion 63 has a function as a voltmeter that detects the drive voltage. The first detection portion 63 can be constituted from the computation circuit, the various elements, and so forth of the plated circuit. The oil supply unit 40 has a communication portion 64 that outputs the result of processing performed by the processing portion 61 (determination information to be discussed later) to the outside. The communication portion 64, which may be a wired communication unit, is a wireless communication unit in the present embodiment.

The drive circuit portion 62 is configured to have a switching element etc., and outputs a drive voltage to the pump 43. The drive voltage is applied to the piezoelectric element 55 of the pump 43 to discharge oil droplets. The drive circuit portion 62 outputs a predetermined drive voltage at a predetermined timing on the basis of an instruction signal from the processing portion 61. That is, operation of the pump 43 is controlled by the processing portion 61.

The processing portion 61 includes, besides the function of controlling operation of the pump 43 described above, a first function, a second function, and a third function to be described below. An overview of the first function, the second function, and the third function is described here, and a specific example will be described later.

First function: a function of determining on the basis of a detection signal from the first detection portion 63 whether or not operation of the pump 43 is appropriate.

Second function: a function of determining on the basis of a detection signal from the sensor 50 (second detection portion) whether or not the rotational state of the bearing portion 20 is appropriate.

Third function: a function of re-determining whether or not the rotational state of the bearing portion 20 is appropriate.

Besides the first function, the second function, and the third function described above, the processing portion 61 has a function of generating determination information related to the lubrication state of the bearing portion 20 on the basis of a detection signal from the first detection portion 63 and a detection signal from the sensor 50 (second detection portion). The "determination information related to the lubrication state" includes "abnormality occurrence information for reporting an abnormality". The abnormality occurrence information is information for notifying a manager that the bearing portion 20 is possibly in a poor lubrication state and is not lubricated well.

Figure 4:
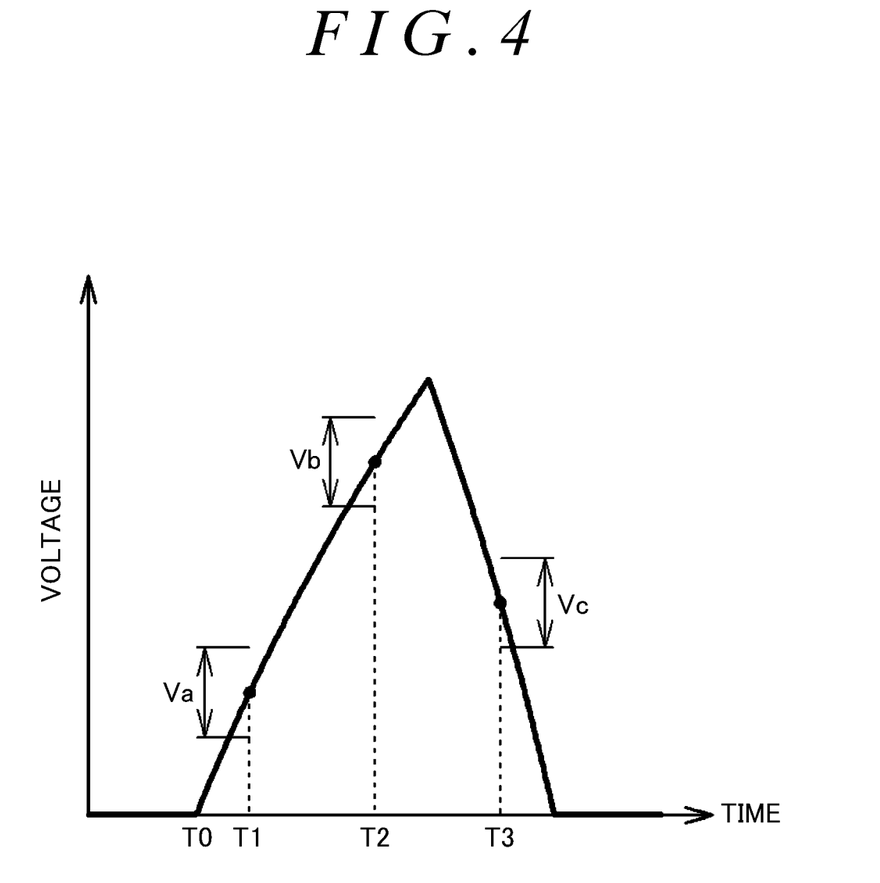
FIG. 4 illustrates a drive voltage for driving a pump during normal times.

The first detection portion 63 is constituted of a circuit portion (voltmeter) that detects the drive voltage of the drive circuit portion 62 to output a detection signal. FIG. 4 illustrates a drive voltage applied from the drive circuit portion 62 to the pump 43 in order to drive the pump 43. In the present embodiment, as illustrated in FIG. 4, the pump 43 normally performs operation to discharge lubricating oil when a drive voltage with a triangular waveform is applied to the pump 43. Thus, the first detection portion 63 measures a voltage output from the drive circuit portion 62 to the pump 43 (piezoelectric element 55) at a plurality of points (three points T1, T2, and T3 in the example in the drawing) after the lapse of predetermined times from the start (point T0) of generation of the drive voltage. The measured voltages are output as a detection result to the processing portion 61. In the case where the voltages which are measured at the points are each in a prescribed voltage range (Va, Vb, and Vc), the processing portion 61 determines such voltages as normal (first function).

Figure 5:
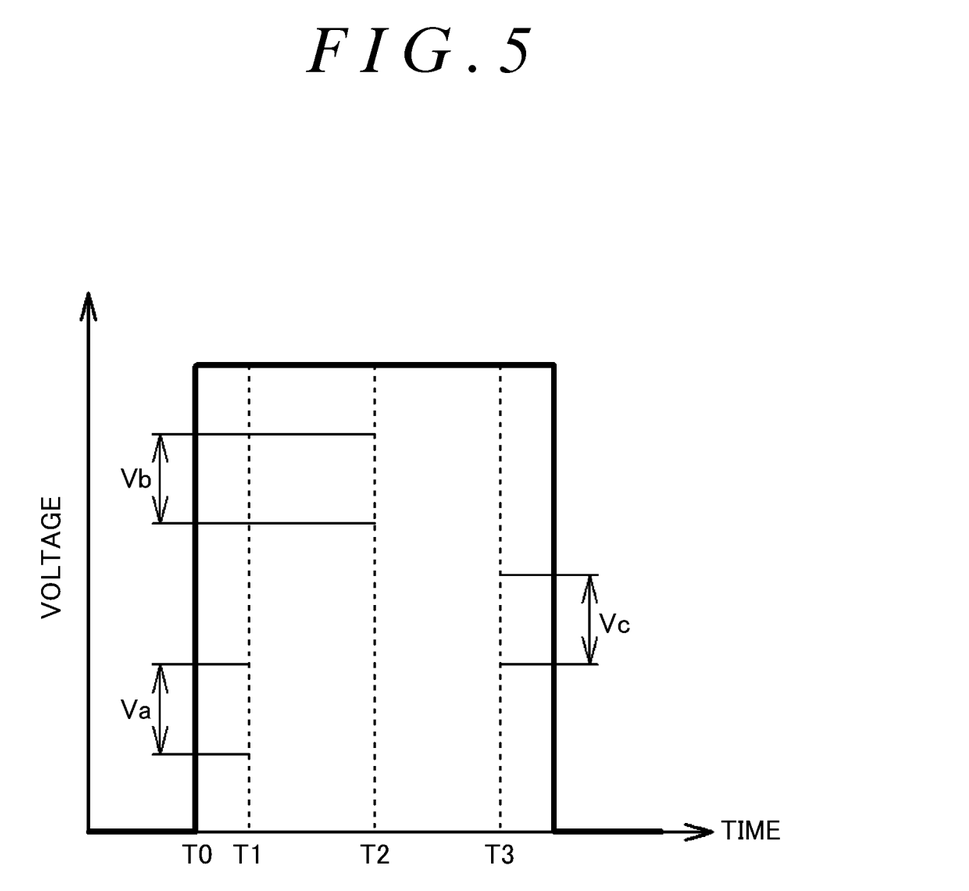
FIG. 5 illustrates a drive voltage during abnormal times.

In the case where the measured voltages are outside the prescribed voltage range, in contrast, the processing portion 61 can determine such voltages as abnormal. FIG. 5 illustrates a drive voltage with a rectangular waveform output from the drive circuit portion 62 during abnormal times. This is an example of a drive voltage output because of a failure of the drive circuit portion 62, for example. In the case of FIG. 5, when the first detection portion 63 measures the voltage which is output from the drive circuit portion 62 at the points (three points T1, T2, and T3) after the lapse of predetermined times from the start (point T0) of generation of the drive voltage, such voltages are each outside the prescribed voltage range (Va, Vb, and Vc). Thus, the processing portion 61 can determine that the pump 43 is not operating normally (i.e. operation of the pump 43 is abnormal) (first function). In this manner, the first detection portion 63 is a sensor portion that detects a drive voltage from the drive circuit portion 62 which drives the pump 43 and that detects whether operation of the pump 43 is normal or abnormal. The first detection portion 63 can detect whether or not the pump 43 is electrically operating normally.

The sensor 50 detects vibration or the temperature of the bearing portion 20 or a sound wave radiated from the bearing portion 20. That is, the sensor 50 is a vibration sensor, a temperature sensor, or an acoustic emission (AE) sensor. The sensor 50 may serve as two or more of such sensors. In the case where the sensor 50 is a vibration sensor, the sensor 50 detects vibration generated at the bearing portion 20 through the outer ring spacer 18. In the case where the sensor 50 is a temperature sensor, the sensor 50 is a non-contact sensor (infrared sensor), and detects the temperature of the cage 24 (annular portion 28a), for example. In the case where the sensor 50 is an AE sensor, the sensor 50 detects an elastic wave as a sound wave when strain energy inside the bearing portion 20 (e.g. the outer ring 22) is radiated as an elastic wave.

For example, when the bearing portion 20 is brought into a poor lubrication state, vibration of the bearing portion 20 may be increased, the temperature of the bearing portion 20 may be raised, or an elastic wave (sound wave) may be radiated with unexpected strain energy accumulated. Thus, the sensor 50 outputs a detection signal that matches the magnitude of the vibration of the bearing portion 20, the temperature of the bearing portion 20, or the received sound wave. Variations in temperature or vibration of the bearing portion 20 and generation of a sound wave (elastic wave) can be considered as variations in rotational state of the bearing portion 20. Thus, the sensor 50 serves as a second detection portion that detects the rotational state of the bearing portion 20. The detection result from the sensor 50 is output to the processing portion 61. The processing portion 61 determines whether or not the rotational state of the bearing portion 20 is appropriate by comparing the detection result from the sensor 50 and a prescribed threshold. That is, the processing portion 61 determines on the basis of a detection signal from the sensor 50 (second detection portion) whether or not the rotational state of the bearing portion 20 is appropriate (second function).

Figure 6:
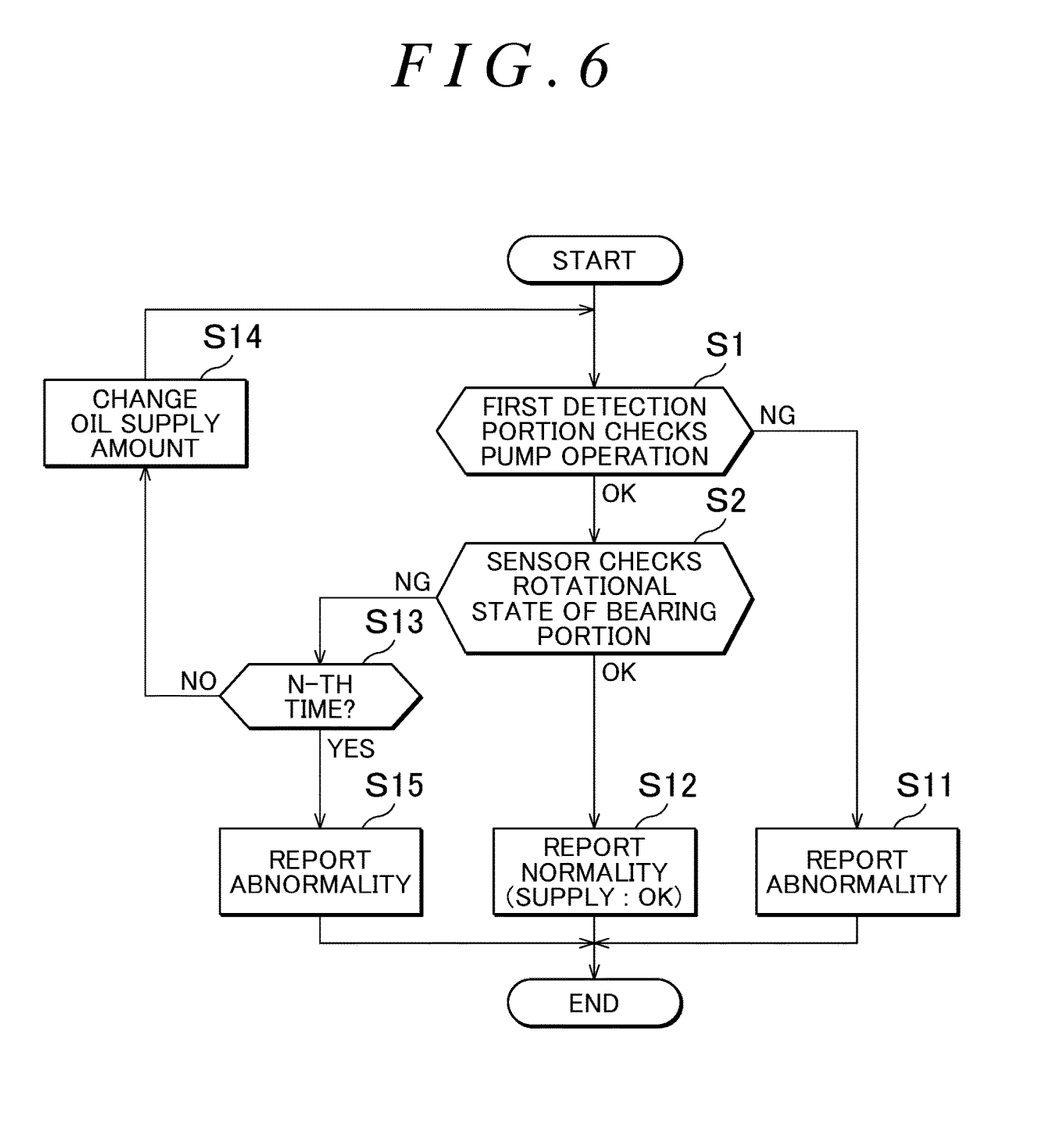
FIG. 6 is a flowchart illustrating processing performed by a control portion.
Figure 7:
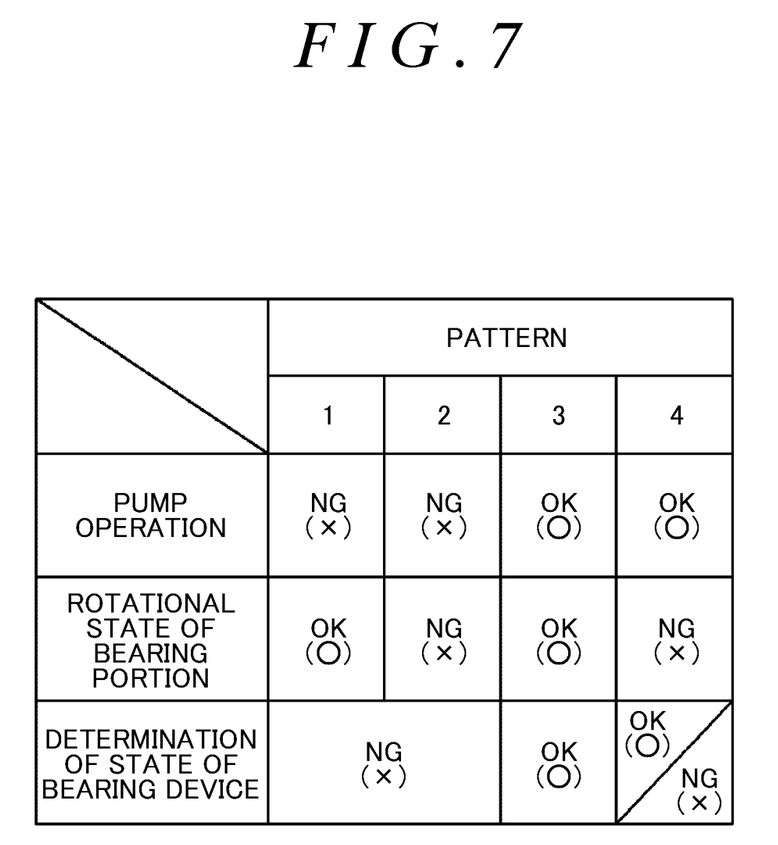
FIG. 7 illustrates patterns of determinations made by the control portion.

Processing operation performed by the sensor 50 and the control portion 44 configured as described above will be described. FIG. 6 is a flowchart illustrating processing performed by the sensor 50 and the control portion 44. FIG. 7 illustrates patterns of determinations made by the control portion 44.

As a first detection step S1 (see FIG. 6), operation of the pump 43 is checked on the basis of a detection signal from the first detection portion 63 with the bearing portion 20 rotating (first function). If it is determined by the processing portion 61 that operation of the pump 43 is abnormal (in the case of "NG" in step S1), the processing portion 61 generates abnormality occurrence information for reporting an abnormality as determination information (processing step S11). The abnormality occurrence information is output from the communication portion 64 to a control panel or the like of the machine tool wirelessly, for example, to inform the manager of the abnormality of the bearing device 10. Consequently, the manager stops operation of the machine tool so that maintenance of the bearing device 10 is performed. In the case where operation of the pump 43 is abnormal ("NG (x)" in FIG. 7) as in pattern 1 and pattern 2 indicated in FIG. 7, the bearing device 10 is determined as "abnormal (NG (x) in FIG. 7)" irrespective of the rotational state of the bearing portion 20.

In contrast, if it is determined by the processing portion 61 that operation of the pump 43 is normal (in the case of "OK" in step S1 in FIG. 6), as a second detection step S2, the rotational state of the bearing portion 20 is checked on the basis of a detection signal from the sensor 50 (second detection portion) (second function). If it is determined by the processing portion 61 that the rotational state of the bearing portion 20 is normal (in the case of "OK" in step S2), the processing portion 61 generates normality information for reporting that oil is supplied normally (i.e. a normality) as determination information (processing step S12). The normality information is output to the control panel or the like of the machine tool through the communication portion 64 to inform the manager of the normality. In the case where operation of the pump 43 is normal ("OK (o)" in FIG. 7) and the rotational state of the bearing portion 20 is normal ("OK (o)" in FIG. 7) as in pattern 3 indicated in FIG. 7, it is determined that the bearing device 10 is normal ("OK (o)" in FIG. 7), and operation of the machine tool is continued.

In the case where it is determined in the first detection step S1 that operation of the pump 43 is normal but it is determined in the second detection step S2 that the rotational state of the bearing portion 20 is abnormal (in the case of "NG" in step S2 in FIG. 6) as in pattern 4 indicated in FIG. 7, the process proceeds to a check step S13. In the check step S13 after it is determined by the sensor 50 that the rotational state of the bearing portion 20 is abnormal, the number of times of oil supply performed with the amount of oil supplied by the pump 43 changed (change step S14) is checked. A prescribed value of the number of times of oil supply with such a change is set in advance in the control portion 44 (in the present embodiment, the prescribed value is "three"). Since oil is not supplied yet after it is determined by the sensor 50 that the rotational state of the bearing portion 20 is abnormal, the processing portion 61 determines "No" in the check step S13, and the process proceeds to the oil supply amount change step S14.

In the oil supply amount change step S14, the processing portion 61 generates an instruction signal for varying the amount of oil supplied by the pump 43, and the instruction signal is output to the pump 43. In the present embodiment, an instruction signal for increasing the amount of oil supplied by the pump 43 is generated and output. In the present embodiment, the cycle of discharge of lubricating oil from the pump 43 is changed to be shorter (in the case of poor lubrication). Accordingly, the frequency of discharge of lubricating oil is increased from the previous frequency, so that the amount of oil supplied by the pump 43 is increased. The instruction signal may be a signal for decreasing the amount of oil supplied by the pump 43. The degree of change (amount of change) in oil supply amount may be varied in accordance with the difference between the detection result from the sensor 50 and the threshold to be compared with the detection result (in the case where an excessive amount of lubricating oil is supplied). The oil supply amount may be varied (increased) by means other than changing the cycle of discharge of lubricating oil from the pump 43. For example, the amount of lubricating oil discharged in one discharge operation of the pump 43 may be changed.

The first detection step S1 is performed for the second time after the lapse of a predetermined time (e.g. several minutes) since the change step S14 is completed and oil is supplied. If it is determined that operation of the pump 43 is normal (in the case of "OK" in step S1), the second detection step S2 is performed for the second time. If it is determined by the processing portion 61 that the rotational state of the bearing portion 20 is normal (in the case of "OK" in step S2), the processing portion 61 generates normality information for reporting that oil is supplied normally as determination information (processing step S12). In this case, oil is supplied to the bearing portion 20 appropriately through supply of lubricating oil by the pump 43 with the oil supply amount changed from the previous value (step S14). As a result, the lubrication state of the bearing portion 20 is improved, which makes the rotational state normal.

In the case where it is determined again in the second detection step S2 performed for the second time that the rotational state of the bearing portion 20 is abnormal (in the case of "NG" in step S2), in contrast, the process proceeds to the check step S13. The number of times of oil supply (step S14) by the pump 43 is "1", and has not reached the prescribed value "3". Therefore, "No" is determined in the check step S13, and the process proceeds to the oil supply amount change step S14. Subsequently, oil is supplied by the pump 43 with the oil supply amount changed in the same manner.

In the case where the lubrication state is not improved because lubricating oil does not reach the oil supply locations of the bearing portion 20 although the pump 43 is operating, the process proceeds as follows. That is, when the first detection step S1 and second detection step S2 are performed for the third time and the number of repetitions of oil supply (step S14) by the pump 43 has reached the prescribed value "3", the process proceeds to a processing step S15. In the processing step S15, the processing portion 61 generates abnormality occurrence information for reporting an abnormality as determination information. That is, it is estimated that an abnormality has occurred when the rotational state of the bearing portion 20 is not improved even if the oil supply amount is increased. The generated abnormality occurrence information is transmitted from the communication portion 64. When the manager sees a control panel that reflects this information, he/she stops operation of the machine tool so that maintenance of the bearing device 10 is performed.

In the embodiment described above, in the case where it is determined in the second detection step S2 indicated in FIG. 6 that the rotational state of the bearing portion 20 is not appropriate, the amount of oil supplied by the pump 43 is varied (step S14 in FIG. 6), and a re-determination is made in at least the second detection step S2. However, the amount of oil supplied by the pump 43 may not be varied in step S14. In this case, the number of times of oil supply by the pump 43 is compared with the prescribed value in the check step S13 after NG is determined in the second detection step S2. If oil has been supplied repeatedly a number of times, namely, the number corresponding to the prescribed value, the process proceeds to the processing step S15.

As described above, the bearing device 10 according to the present embodiment includes the first detection portion 63, the sensor (second detection portion) 50, and the processing portion 61. The first detection portion 63 detects operation of the pump 43 of the oil supply unit 40. The sensor (second detection portion) 50 detects the rotational state of the bearing portion 20. The processing portion 61 generates determination information related to the lubrication state of the bearing portion 20 on the basis of a detection signal from the first detection portion 63 and a detection signal from the sensor 50. A method of detecting an abnormality of the bearing portion 20, which is performed by the bearing device 10, includes the first detection step (S1 in FIG. 6), the second detection step (S2 in FIG. 6), and the processing step (S11, S12, and S15 in FIG. 6). The first detection step includes detecting operation of the pump 43. The second detection step includes detecting the rotational state of the bearing portion 20. The processing step includes generating determination information related to the lubrication state of the bearing portion 20. In the processing step (S11, S12, and S15 in FIG. 6), determination information related to the lubrication state of the bearing portion 20 is generated on the basis of the result of detection in the first detection step (S1) and the result of detection in the second detection step (S2).

In such a method of detecting an abnormality in the bearing device 10, the rotational state of the bearing portion 20 is varied because of a shortage of lubricating oil in the case where oil is not supplied to the desired oil supply locations although the pump 43 is operating normally, for example, and thus such variations are detected by the sensor 50. This detection result allows the processing portion 61 to determine that the lubrication state of the bearing portion 20 is not appropriate, and this determination result is output to an external control panel as the determination information. Consequently, the manager can perform maintenance etc. of the bearing device 10, which makes it possible to suppress occurrence of a defect at the bearing portion 20.

In the case of the present embodiment, as described in relation to FIG. 4, the first detection portion 63 detects the drive voltage of the pump 43. The processing portion 61 determines whether or not operation of the pump 43 is appropriate by determining the drive voltage of the pump 43 which is the detection result from the first detection portion 63. Consequently, if there is trouble with the drive circuit portion 62 which drives the pump 43 (in the case of "NG" in the first detection step S1 in FIG. 6), for example, such trouble is detected (processing step S11).

In the present embodiment, vibration (or the temperature or a sound wave) from the bearing portion 20 is detected by the sensor 50 as the second detection portion. The processing portion 61 determines whether or not the rotational state of the bearing portion 20 is appropriate by determining vibration (or the temperature or a sound wave) of the bearing portion 20 which is the detection result from the sensor 50. Consequently, it is determined that the rotational state of the bearing portion 20 is not appropriate (processing step S15) in the case where oil is not appropriately supplied to the oil supply locations of the bearing portion 20 with the ejection port 51 of the pump 43 blocked, for example, even if the pump 43 is operating normally (in the case of "NG" in the second detection step S2 in FIG. 6, by way of the check step S13).

Besides the first function and the second function, the processing portion 61 further has the third function. The third function includes outputting, to the pump 43, an instruction signal for oil supplied by the pump 43 (change step S14) when it is determined through the first function that operation of the pump 43 is appropriate ("OK" in the first detection step S1) and it is determined through the second function that the rotational state of the bearing portion 20 is not appropriate ("NG" in the second detection step S2). The third function also includes performing the first detection step S1 for checking operation of the pump 43 and the second detection step S2 for checking the rotational state of the bearing portion 20 again after the lapse of a predetermined time. The third function may not include performing the first detection step S1 after the lapse of the predetermined time. That is, the processing portion 61 has the third function of re-determining whether or not the rotational state of the bearing portion 20 is appropriate through at least the second function. In the present embodiment, an instruction signal for varying the amount of oil supplied by the pump 43 is output as the instruction signal to the pump 43 (change step S14).

The third function operates as follows. There may be a case where the rotational state of the bearing portion 20 is not appropriate because of a shortage of lubricating oil when the load state of the bearing portion 20 is varied, for example, although operation of the pump 43 is appropriate. In such an event, the amount of oil supplied by the pump 43 is varied, and it is re-determined after the lapse of a predetermined time whether or not the rotational state of the bearing portion 20 is appropriate. Even if there is a temporary shortage of lubricating oil in the case where the load state of the bearing portion 20 is varied, for example, such a temporary shortage of lubricating oil may be resolved by increasing the oil supply amount. If the rotational state of the bearing portion 20 has become appropriate as a result of the re-determination ("OK" in the second detection step S2), operation can be continued. It is possible to obtain a lubrication state that matches the load state.

When the processing portion 61 performs the processing of the third function a plurality of times and it is determined through the second function (in the last of the plurality of times) that the rotational state of the bearing portion 20 is not appropriate (in the case of "YES" in the check step S13), in contrast, abnormality occurrence information for reporting an abnormality is generated as the determination information (processing step S15). With this configuration, as described above, operation is continued if the rotational state of the bearing portion 20 has become appropriate with oil supplied by the pump 43 (processing step S12). If the rotational state of the bearing portion 20 is not appropriate even if the processing of the third function is performed a plurality of times, however, abnormality occurrence information is generated at that time (to the processing step S15).

The abnormality occurrence information is transmitted to the outside by the communication portion 64. When the manager confirms the abnormality occurrence information, he/she can take measures such as stopping operation of the machine tool and perform maintenance of the bearing device 10.

From the above, with the bearing device 10 according to the present embodiment, there may be a case where oil is not supplied to the desired oil supply locations although the pump 43 is operating normally, for example. In this event, the bearing portion 20 is brought into a poor lubrication state, the rotational state of the bearing portion 20 is varied, and thus such variations are detected by the sensor 50. As a result, if it is determined that the lubrication state of the bearing portion 20 is not appropriate, the determination result (determination information) is output to the control panel of the machine tool, for example. The manager can perform maintenance etc. of the device on the basis of the determination (determination information). From the above, it is possible to suppress occurrence of a defect at the bearing portion 20, which allows the manager to use the machine tool including the bearing portion 20 with a sense of security.

The embodiment disclosed above is exemplary in all respects, and is not limiting. That is, the rolling bearing device according to the present invention is not limited to the illustrated embodiment, and may be in other embodiments without departing from the scope of the present invention. For example, the bearing portion 20 illustrated in FIG. 1 is an angular contact ball bearing. However, the type of the bearing is not limited thereto, and may be a deep-groove ball bearing. In addition, the bearing portion 20 may be a tapered roller bearing, a cylindrical roller bearing, or the like that has rollers as the rolling elements.

In the present invention, the rotational state of the bearing portion is varied in the case where oil is not supplied to the desired oil supply locations although the pump is operating normally, for example, and thus such variations are detected. In the case where the rotational state of the bearing portion is not appropriate, oil is supplied by the pump, and it is re-determined after the lapse of a predetermined time whether or not the rotational state of the bearing portion is appropriate. When the result shows that the rotational state of the bearing portion is not appropriate, maintenance etc. of the device is performed, so that it is possible to suppress occurrence of a defect at the bearing portion. Consequently, the manager can use a device including the rolling bearing device with a sense of security.

What is claimed is:

1. A rolling bearing device comprising:
    a bearing portion that has an inner ring, an outer ring, and a plurality of rolling elements provided between the inner ring and the outer ring;
    an oil supply unit that has a pump that supplies lubricating oil to an annular space formed between the inner ring and the outer ring;
    a first detection portion that detects operation of the pump;
    a second detection portion that detects a rotational state of the bearing portion; and
    a processing portion that generates determination information related to a lubrication state of the bearing portion on the basis of a detection signal from the first detection portion and a detection signal from the second detection portion, wherein:
    the processing portion has a first function of determining whether or not the operation of the pump is normal by comparing the detection signal from the first detection portion with a first prescribed threshold, and a second function of determining whether or not the rotational state of the bearing portion is normal by comparing the detection signal from the second detection portion with a second prescribed threshold; and
    the processing portion further has a third function of outputting, to the pump, an instruction signal for oil supplied by the pump when it is determined through the first function that the operation of the pump is normal and it is determined through the second function that the rotational state of the bearing portion is not normal, and re-determining whether or not the rotational state of the bearing portion is normal through at least the second function after lapse of a predetermined time.

2. The rolling bearing device according to claim 1, wherein
    when it is determined through the first function that the operation of the pump is normal and when it is determined through the second function that the rotational state of the bearing portion is not normal, the processing portion outputs, to the pump, an instruction signal for varying an amount of oil supplied by the pump as the instruction signal.

3. The rolling bearing device according to claim 2, wherein
    when it is determined through the second function that the rotational state of the bearing portion is not normal after processing of the third function is performed a plurality of times, the processing portion generates abnormality occurrence information for reporting an abnormality as the determination information.

4. The rolling bearing device according to claim 1, wherein
    when it is determined through the second function that the rotational state of the bearing portion is not normal after processing of the third function is performed a plurality of times, the processing portion generates abnormality occurrence information for reporting an abnormality as the determination information.

5. A method of detecting an abnormality of a bearing portion that has an inner ring, an outer ring, and a plurality of rolling elements provided between the inner ring and the outer ring, the bearing portion being supplied with lubricating oil by a pump that supplies lubricating oil to an annular space formed between the inner ring and the outer ring, the method comprising:
    a first detection step of detecting operation of the pump;
    a second detection step of detecting a rotational state of the bearing portion; and
    a processing step of generating determination information related to a lubrication state of the bearing portion on the basis of a result of detection in the first detection step and a result of detection in the second detection step, wherein:
    the processing step includes determining whether or not the operation of the pump is normal by comparing the result of detection in the first detection step with a first prescribed threshold, and determining whether or not the rotational state of the bearing portion is normal by comparing the result of detection in the second detection step with a second prescribed threshold; and
    the processing step further includes outputting, to the pump, an instruction signal for oil supplied by the pump when it is determined that the operation of the pump is normal and that the rotational state of the bearing portion is not normal, and re-determining at least whether or not the rotational state of the bearing portion is normal after lapse of a predetermined time.

\* \* \* \* \*